Figure 1:
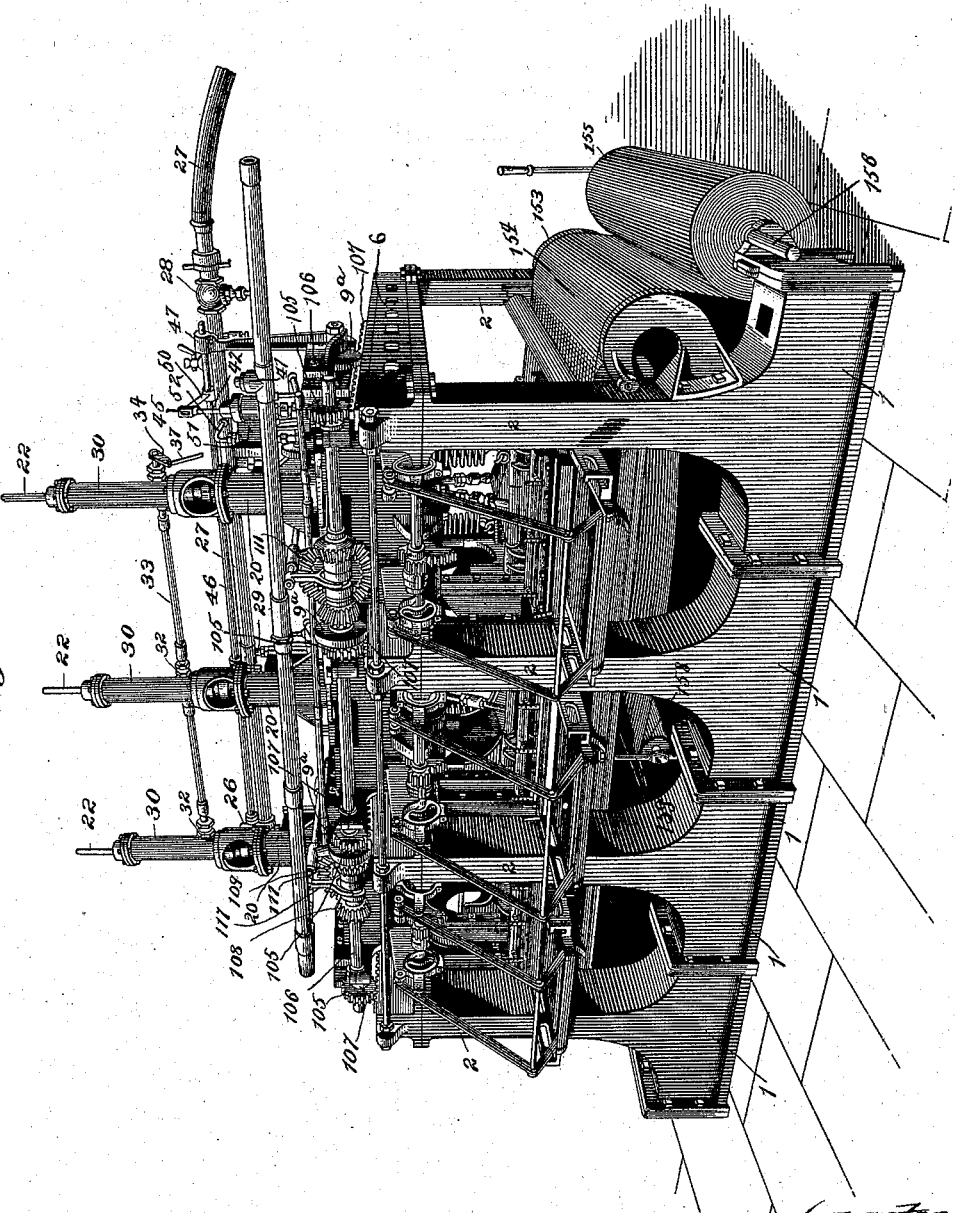

(No Model.)　　　　　　　　　　　　　15 Sheets—Sheet 1.
T. DALE.
MACHINE FOR PRINTING LINOLEUM OR FLOOR CLOTH, &c.

No. 573,965.　　　　　　　　　　Patented Dec. 29, 1896.

(No Model.) 15 Sheets—Sheet 6.

T. DALE.
MACHINE FOR PRINTING LINOLEUM OR FLOOR CLOTH, &c.

No. 573,965. Patented Dec. 29, 1896.

Witnesses:
Harry S. Rohrer
Geo. E. Cruse

Inventor:
Thomas Dale
By Knight Bros
Attys.

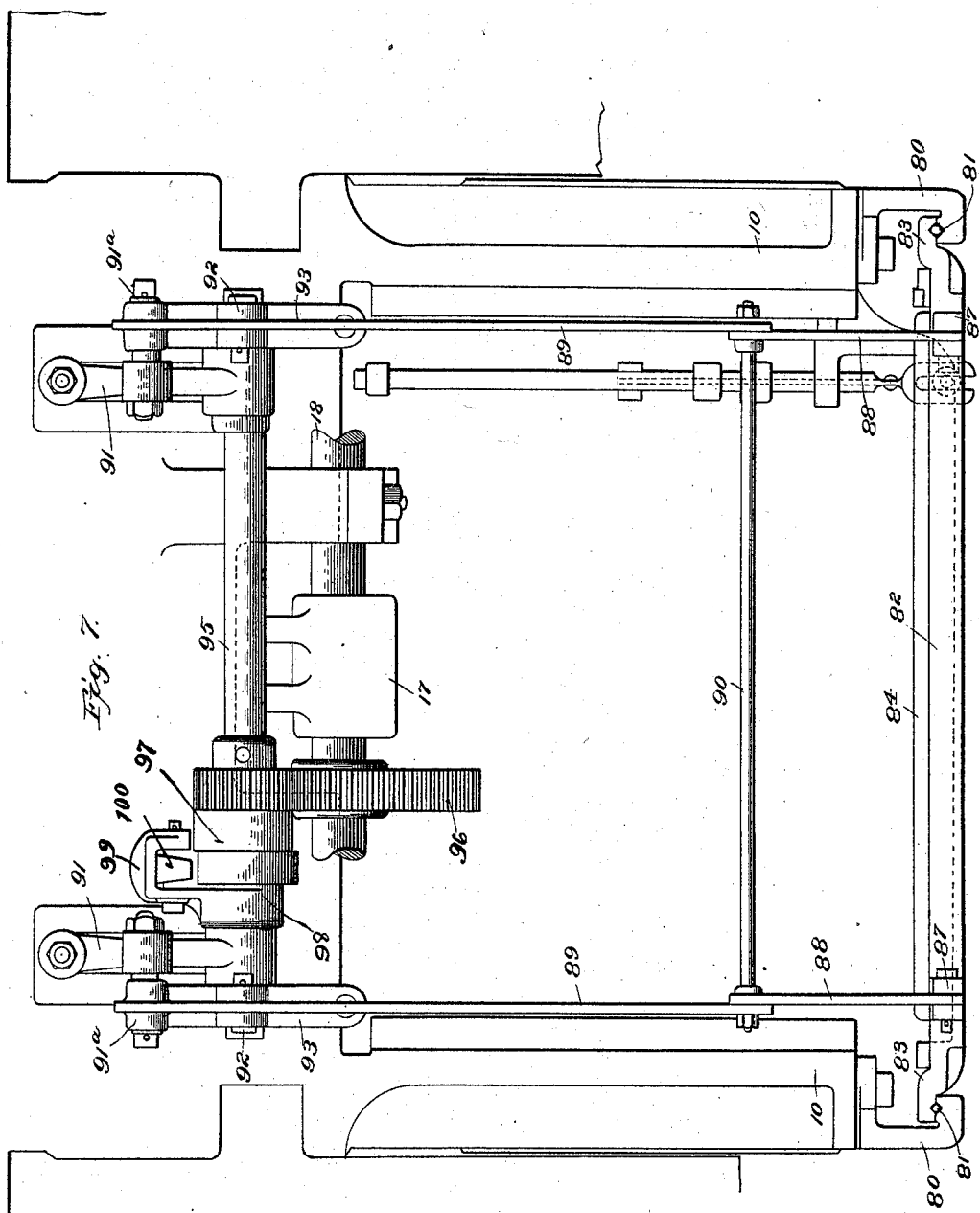

(No Model.) 15 Sheets—Sheet 8.
T. DALE.
MACHINE FOR PRINTING LINOLEUM OR FLOOR CLOTH, &c.
No. 573,965. Patented Dec. 29, 1896.
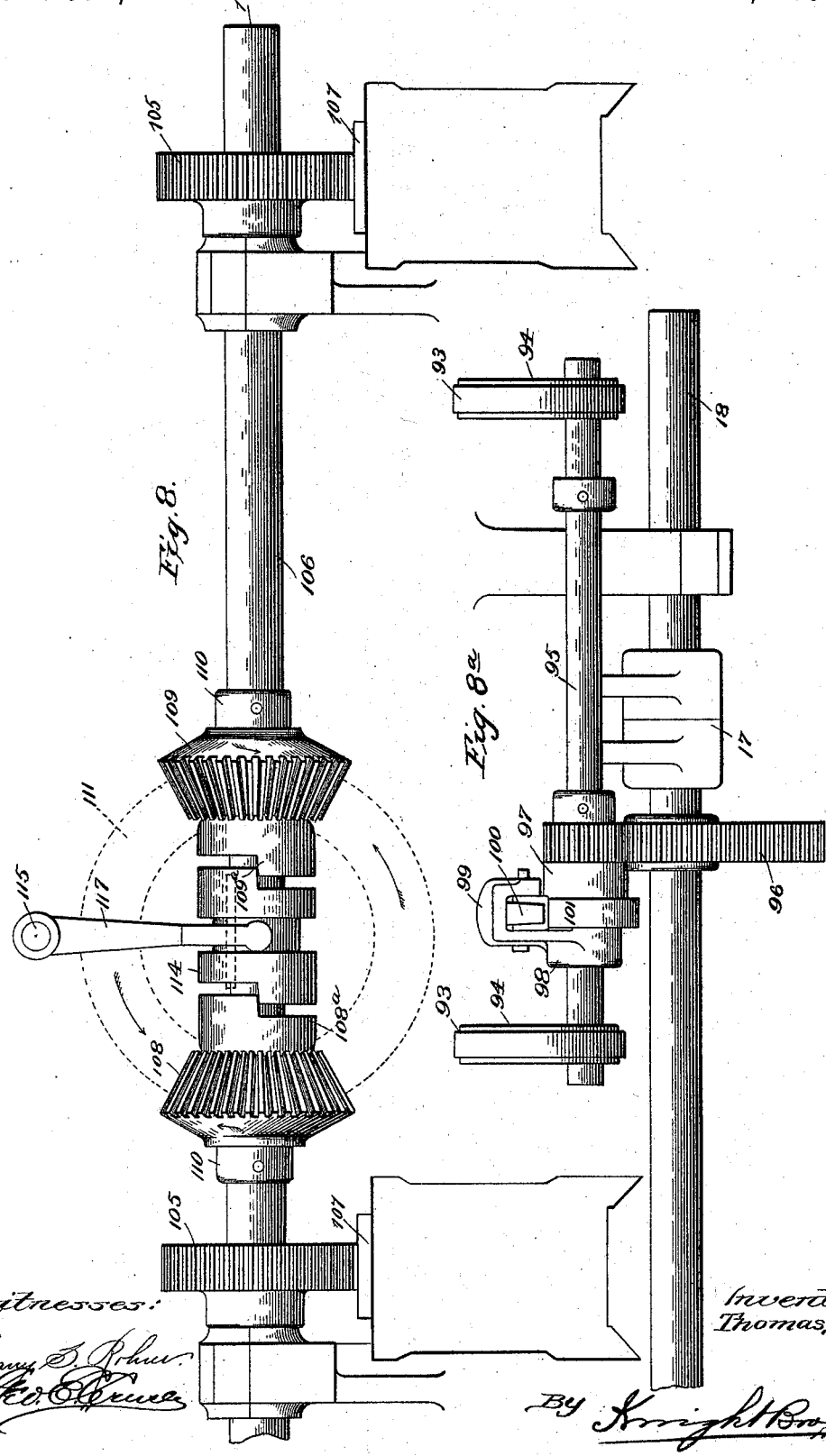
Witnesses:
Harry B. Rohr
Geo. Cruse
Inventor:
Thomas Dale.
By Knight Bros. Attys.

(No Model.) 15 Sheets—Sheet 9.
T. DALE.
MACHINE FOR PRINTING LINOLEUM OR FLOOR CLOTH, &c.
No. 573,965. Patented Dec. 29, 1896.
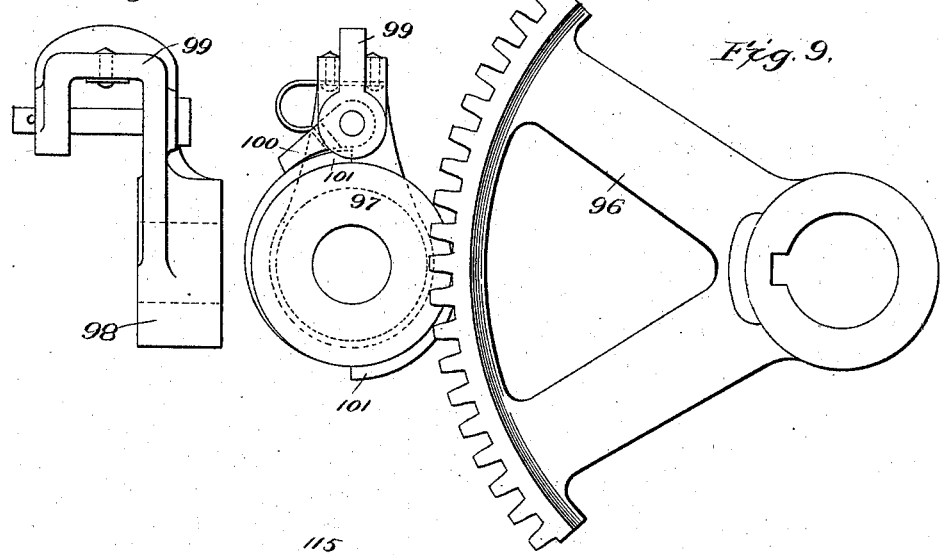
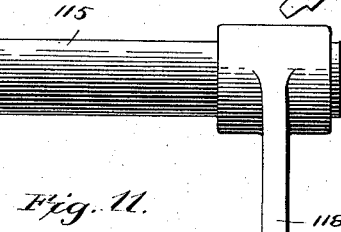
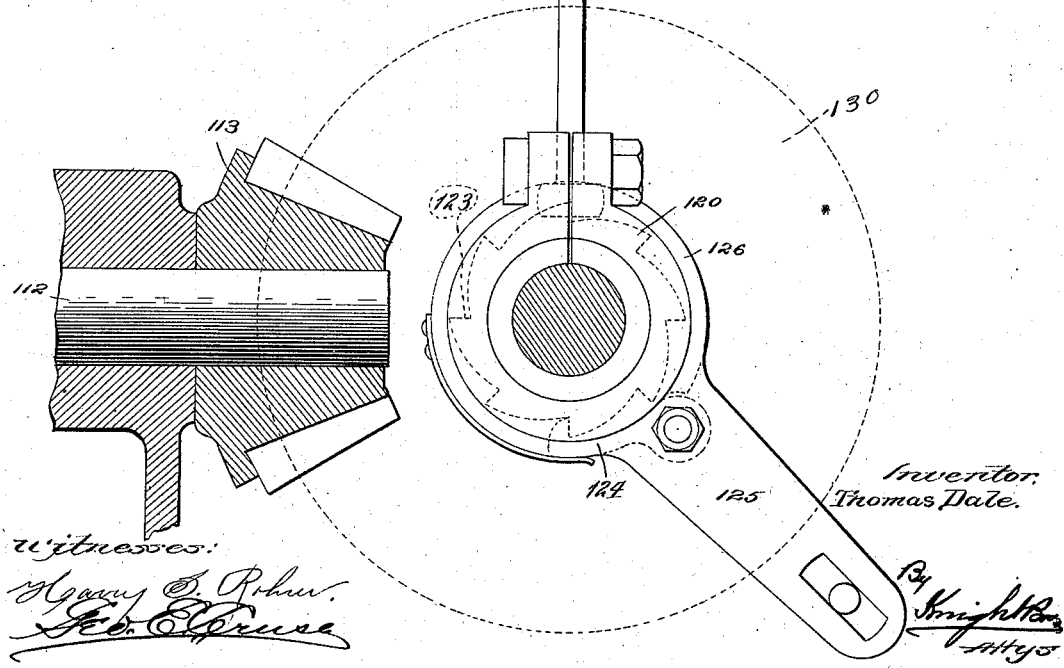

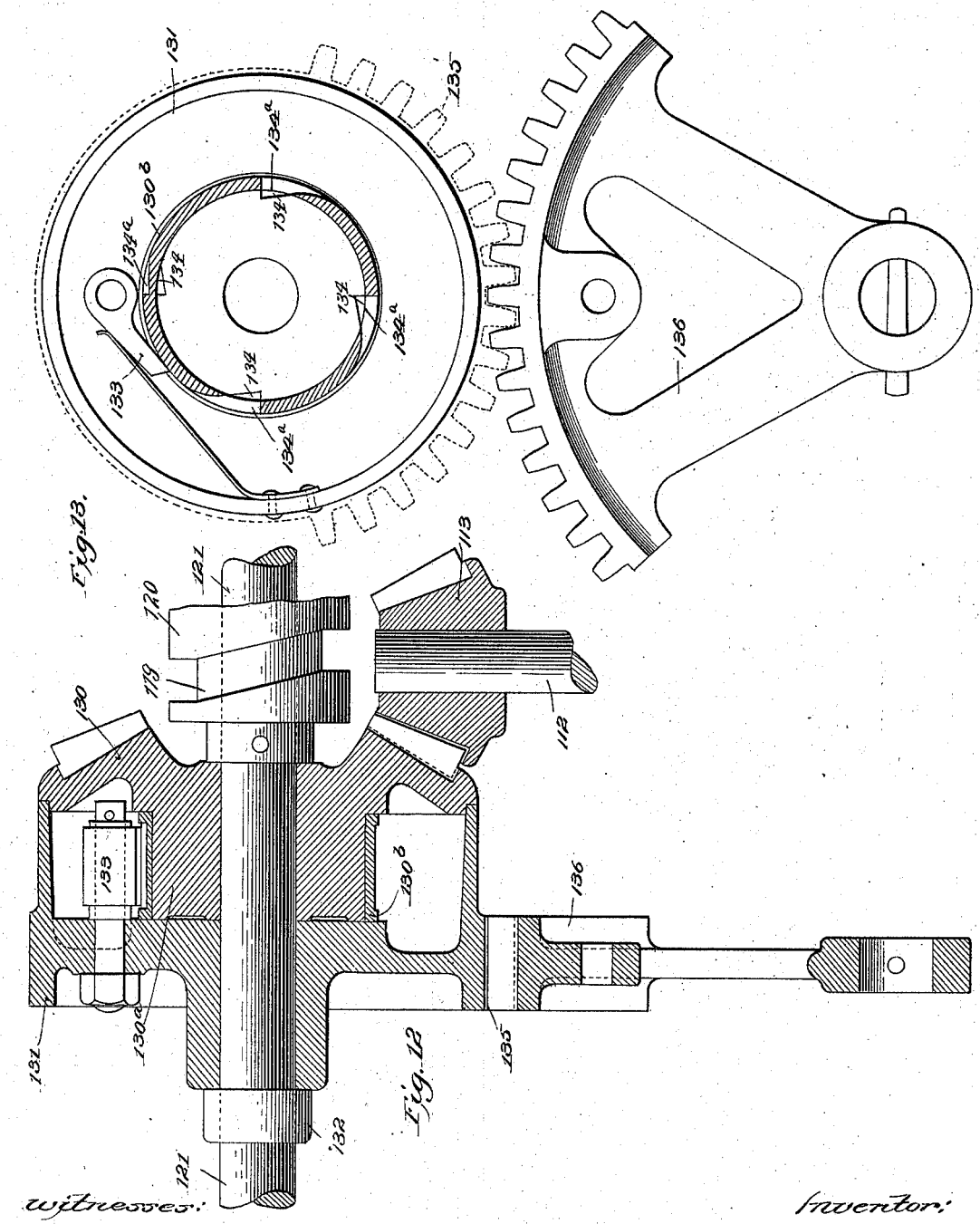

(No Model.) 15 Sheets—Sheet 11.
T. DALE.
MACHINE FOR PRINTING LINOLEUM OR FLOOR CLOTH, &c.
No. 573,965. Patented Dec. 29, 1896.
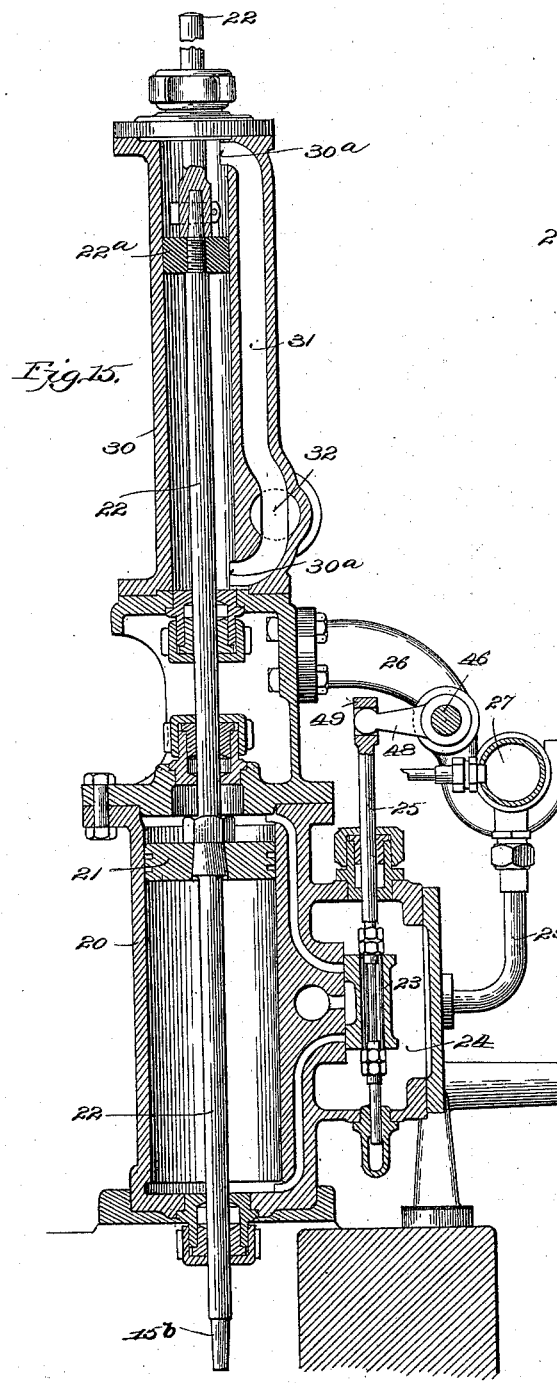
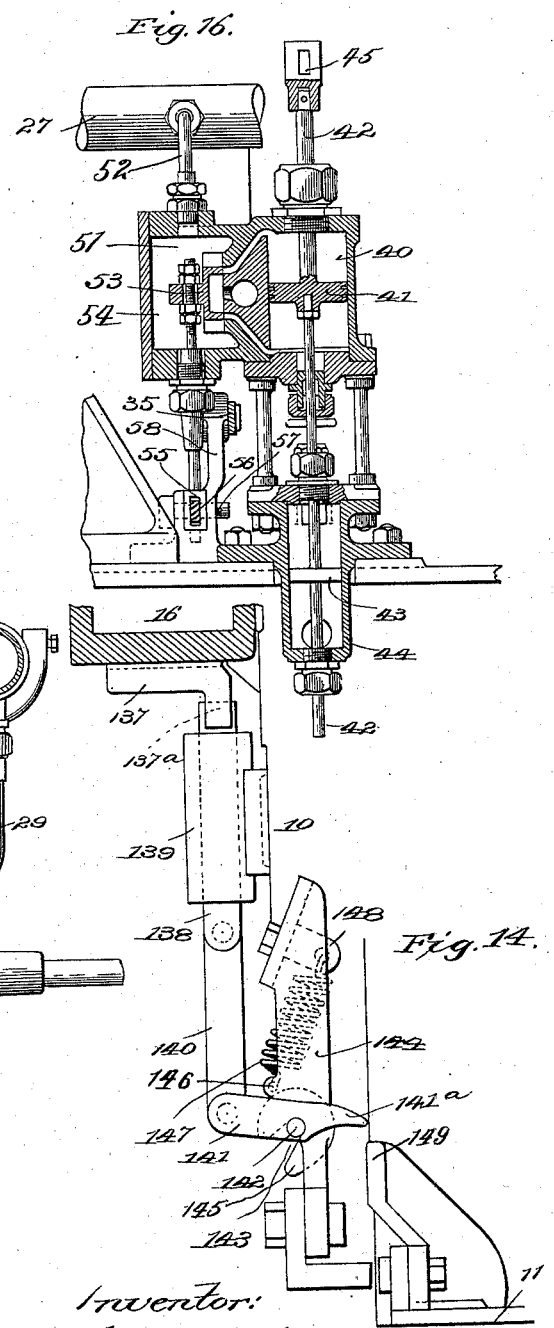

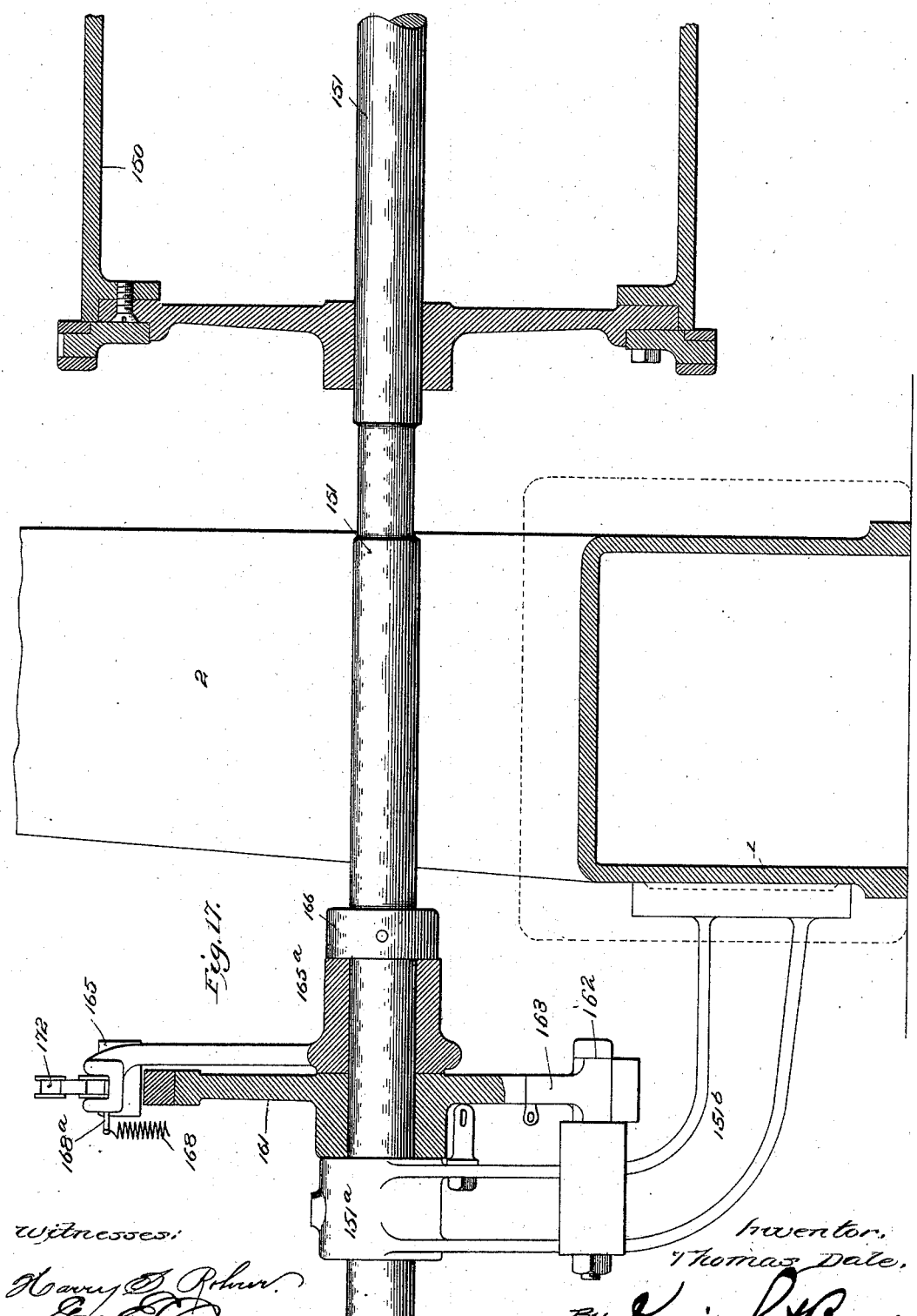

(No Model.) T. DALE. 15 Sheets—Sheet 13.
MACHINE FOR PRINTING LINOLEUM OR FLOOR CLOTH, &c.
No. 573,965. Patented Dec. 29, 1896.
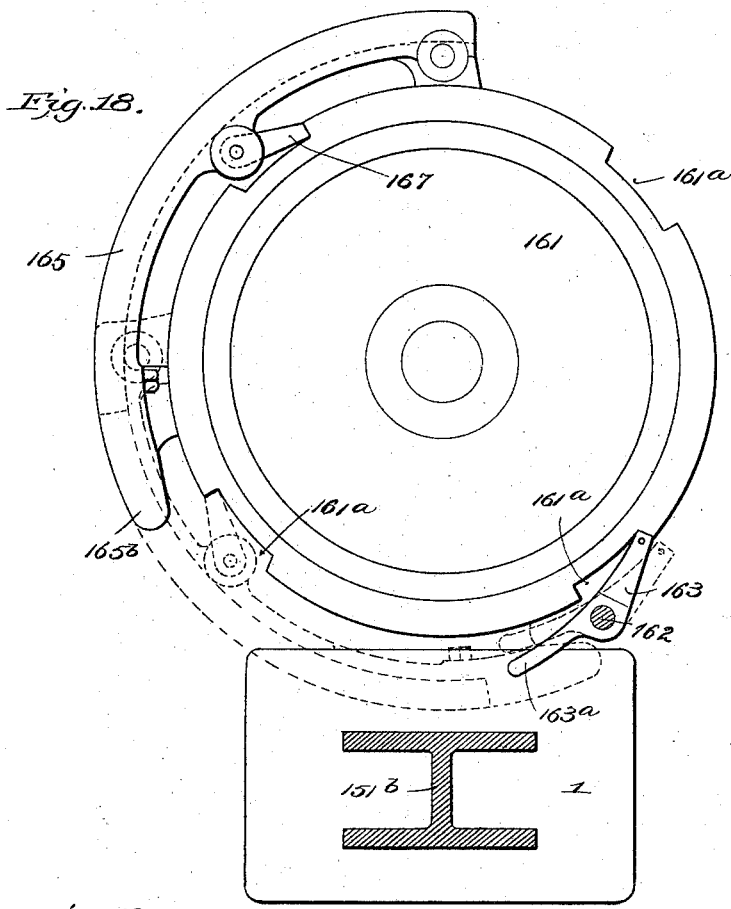
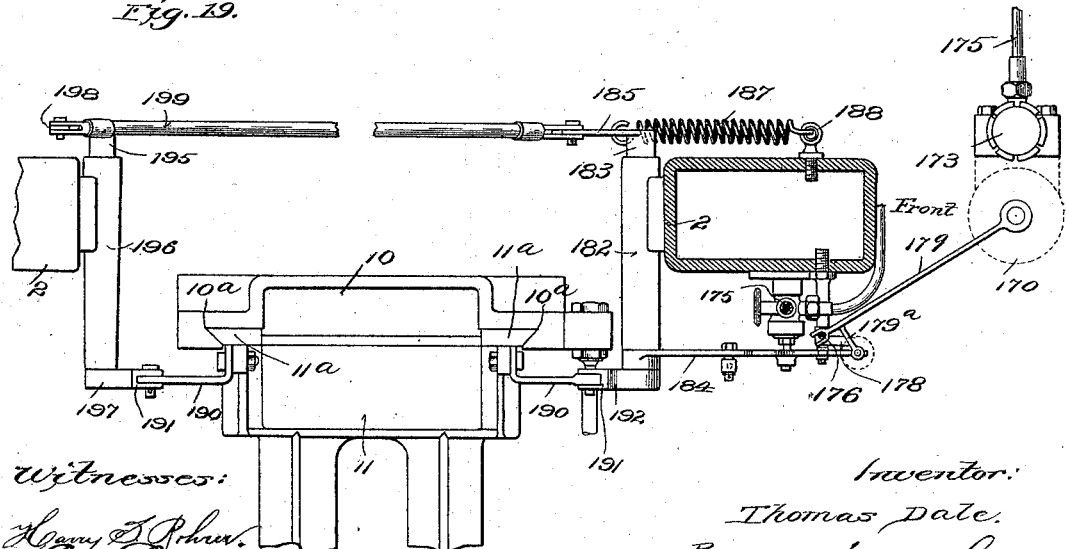

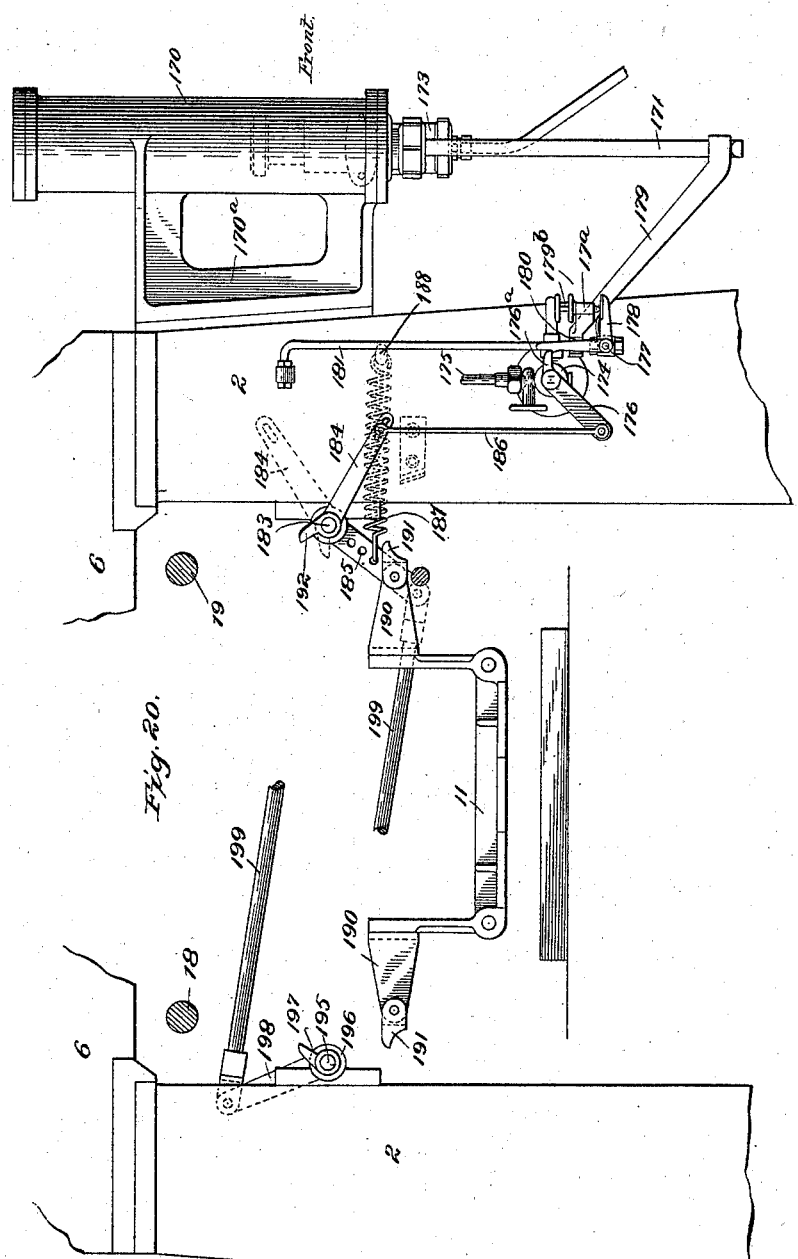

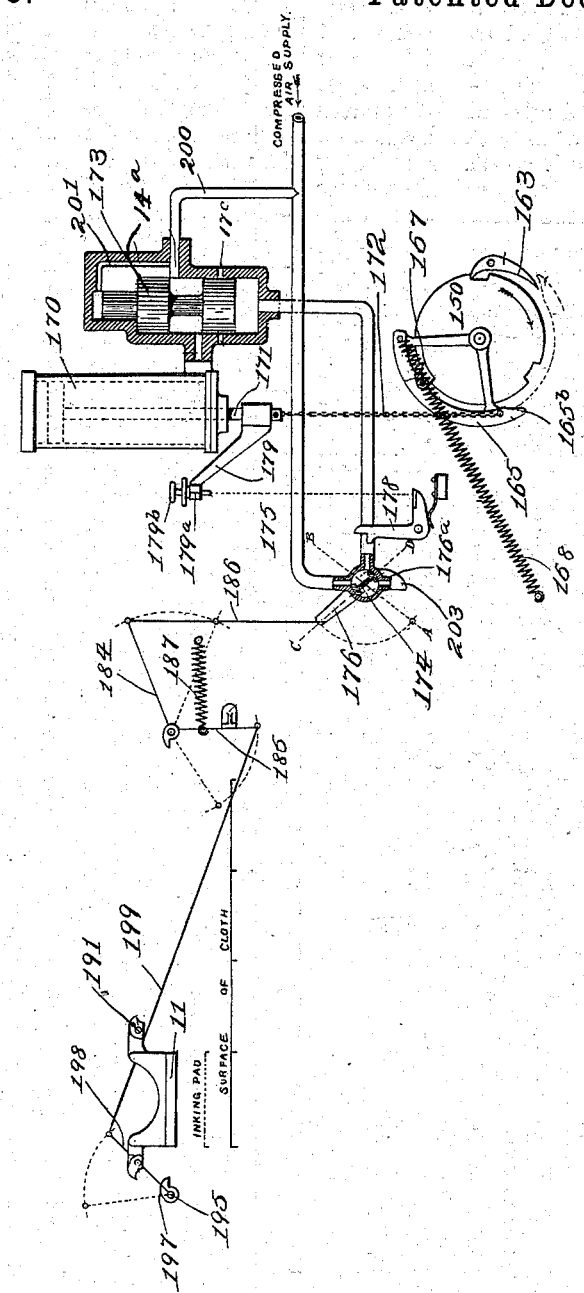

United States Patent Office.

THOMAS DALE, OF KIRKCALDY, SCOTLAND.

MACHINE FOR PRINTING LINOLEUM OR FLOOR-CLOTH, &c.

SPECIFICATION forming part of Letters Patent No. 573,965, dated December 29, 1896.

Application filed January 13, 1893. Serial No. 458,293. (No model.)

*To all whom it may concern:*

Be it known that I, THOMAS DALE, engineer, residing at 200 High Street, Kirkcaldy, Scotland, have invented certain new and useful Improvements in Machines for Printing Linoleum or Floor-Cloth, &c.; and I do hereby declare that the following specification, taken in connection with the accompanying drawings, which form a part of the same, is a full, clear, and exact description of my improvements, such as will enable those skilled in the art to make and use the same.

Machines for printing floor-cloth are usually constructed with one or more outline and filling-in blocks, which receive the color from any suitable color-supplying device and are forced down upon the cloth for printing thereon, and suitable means for imparting an intermittent longitudinal movement to the cloth between the strokes of the printing-blocks in order that the cloth will be printed upon throughout its length.

My present invention relates to the class of machines having the above-described general characteristics.

The object of my invention is to dispense in part or in whole with the customary gearing, shafts, and cams and provide for the necessary movements of the printing-blocks, cloth, and other parts by the employment of one or more cylinders provided with pistons operated by compressed air, steam, water, or other fluid. To properly regulate and control the operation of the pistons and other parts, the necessary valves and valve motions are also provided.

In carrying out my invention I provide a suitable framework which affords a table for supporting the cloth to be printed upon, and above the table suitable rails or tracks, upon which the carriage is supported for carrying the printing-blocks and the cylinders and pistons for operating them. One cylinder and piston may operate several printing-blocks, or each block may be operated by one cylinder and piston, or, if the block is very wide, it may have two or more cylinders to operate it. When the printing-blocks to be used are of less width than the material to be printed upon, as is usually the case, the carriages or frames carrying the printing-blocks can be made to move transversely on the rails, so as to travel across the material and print upon the whole surface. An intermittently-operating device is also provided for moving the cloth longitudinally as fast as it is printed upon, and the cloth-moving device, means for moving the carriage transversely, and all other moving parts are actuated by the compressed air or other fluid, or by suitable connections with other parts which are so operated.

There are numerous details of construction in addition to the important features above pointed out, and all of these will first be particularly pointed out in connection with the accompanying drawings, and the novel features upon which I desire protection will afterward be designated in the annexed claims.

The number of printing-blocks which it is necessary to employ depends upon the number of colors to be printed upon the cloth, one block being required for each color. In the particular machine illustrated in the accompanying drawings three blocks are employed for printing three colors.

Figure 2:
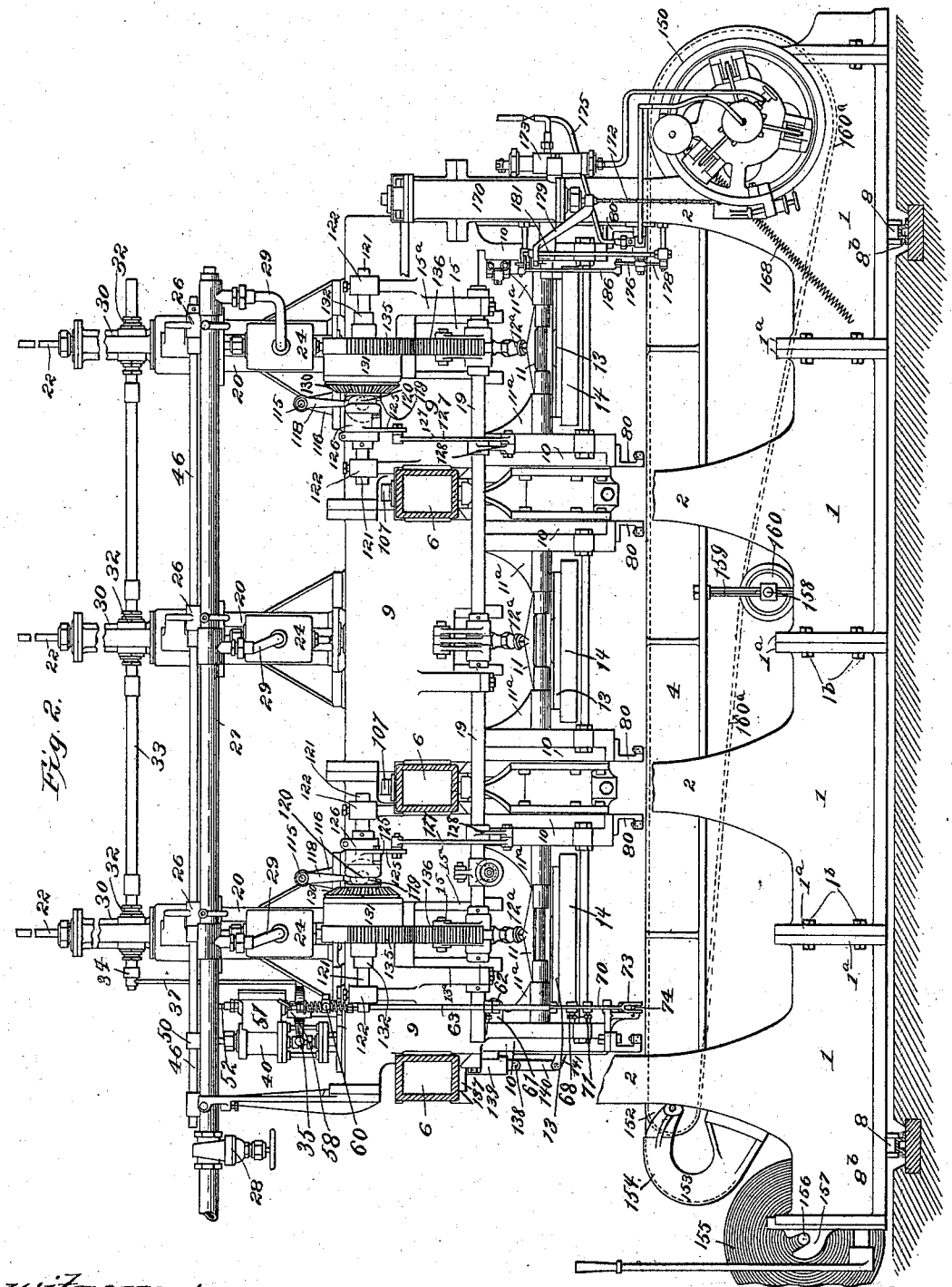
Figure 3:
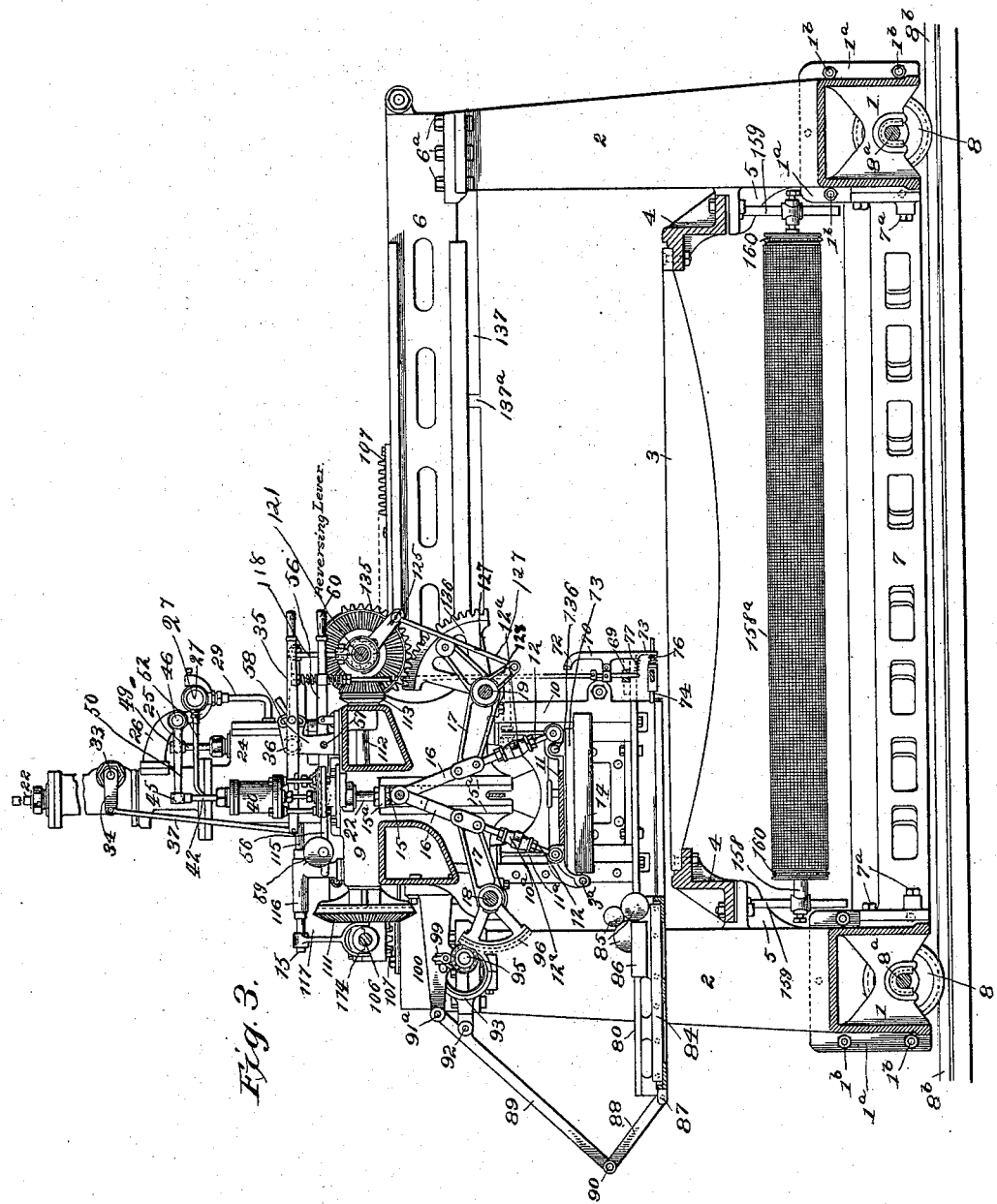
Figure 4:
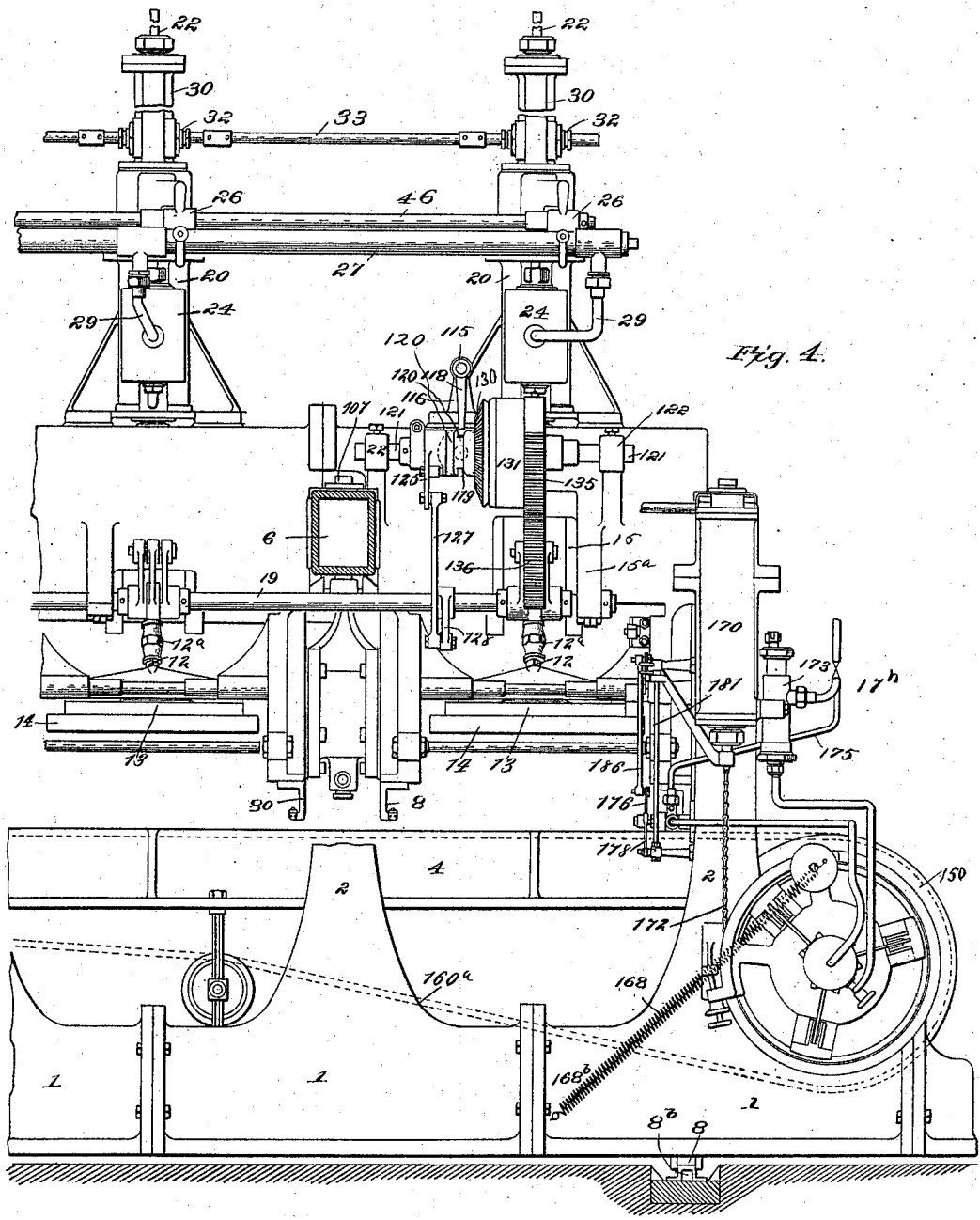
Figure 5:
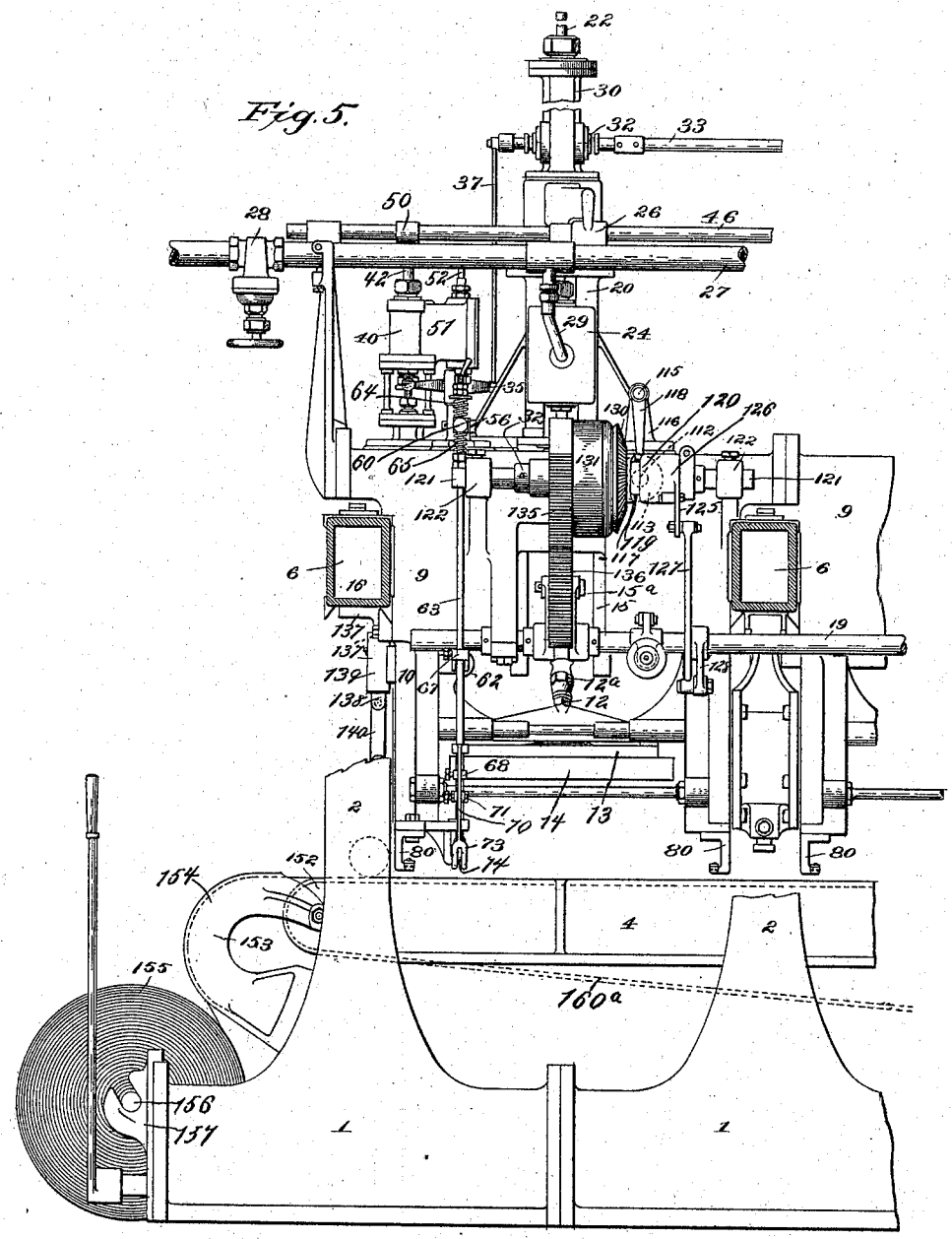
Figure 6:
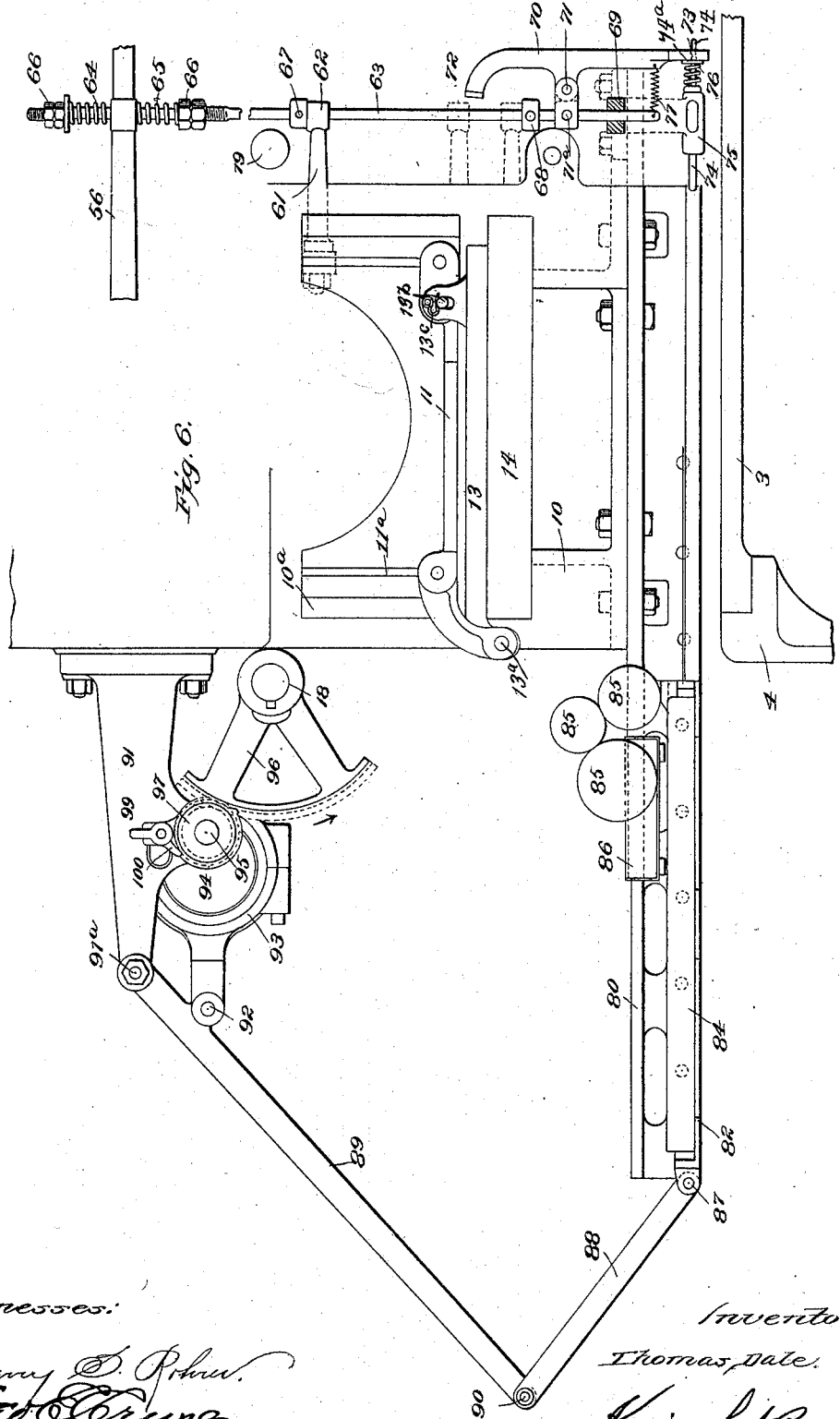

In said drawings, Figure 1 is a rear perspective view of my improved floor-cloth-printing machine. Fig. 2 is a front elevation of the same, having parts broken away to disclose the interior mechanism. Fig. 3 is a transverse sectional view of the same. Fig. 4 is an enlarged front elevation of the right-hand end of the machine, having parts broken away. Fig. 5 is a similar view of the left-hand end of the machine. Fig. 6 is an enlarged sectional detail elevation of the parts of the mechanism shown in Fig. 3 for applying color to the printing-blocks and for automatically reversing the block-impressing mechanism. Fig. 7 is a detail rear elevation of the mechanism shown in Fig. 6. Fig. 8 is an enlarged detail rear elevation of parts of the mechanisms for moving the carriage transversely. Fig. 8ᵃ is an enlarged detail view of the mechanism for actuating the color-applying device. Figs. 9 and 10 are enlarged detail views of the mechanism for transferring movement from the block-carrying device to the color-applying device. Figs. 11, 12, and 13 are enlarged detail views showing parts of the mechanism for moving the carriage or block-carrying frames transversely on the main frame. Fig. 14 is an enlarged detail view of the mechanism for automatically locking the block-carrying frames in position on the main frame. Fig. 15 is a vertical sectional view of the main cylinder and controlling valves. Fig. 16 is a vertical sectional view of the auxiliary controlling-cylinder. Fig. 17 is an enlarged detail sectional view of the mechanism for feeding the cloth longitudinally forward after the surface has been printed upon. Fig. 18 is a detail end elevation of the same. Fig. 19 is a detail sectional plan. Fig. 20 is a detail front elevation of the mechanism which controls the cloth-moving mechanism, and Fig. 21 is a diagrammatic view of the cloth-winding mechanism.

Like numerals of reference indicate the same parts throughout the several views.

The framework upon which the machine is organized consists of a series of standards each comprising an oblong base portion 1 and a vertical column 2, a trussed table 3, supported between the standards by means of the longitudinally-extending flanged bars 4, resting on the inwardly-projecting shoulders 5, formed integral with the standards, (see Fig. 3;) upper transverse beams or rails 6, extending from the tops of the front columns 2 to the tops of the rear columns 2; and the lower bracing-beams 7, which extend between the base portions 1. The base portions 1 are formed with corresponding flanges $1^a$, through which extend the clamping-bolts $1^b$ for securing the bases of the standards together. The upper transverse beams 6 are securely bolted to the columns 2 by the clamping-bolts $6^a$, and the lower beams 7 are securely bolted to the bases 1 by the clamping-bolts $7^a$. The frame is preferably supported upon wheels 8, which are journaled on axles $8^a$ in the base-pieces 1 of the standards and run upon the track-rails $8^b$. By this means the machine can be readily moved from one part of the room to another.

The carriage or framework for supporting the printing machinery comprises three sections of hollow castings 9, which are formed of the proper shape to fit around and guide upon the upper transverse beams 6 in moving transversely and are securely bolted together to form a single carriage which is supported upon the wheels $9^a$, which rest upon the upper surface of the beams 6. This carriage is formed with numerous minor parts, which will be referred to in detail in connection with the rest of the machinery. Each section of the carriage rests between two sets of standards and cross-beams of the main frame, as shown in the drawings.

10 are downwardly-projecting extensions of the carrying-frames 9, (which constitute the carriage,) formed with the V-guides $10^a$ (see Fig. 19) for insuring the regular and accurate motion of the printing-blocks.

11 is the platen-carrying frame, provided at its four corners with the webbed guide-pieces $11^a$, which engage in the guide-grooves $10^a$ and guide the frame in its vertical reciprocation. The platen-carrying frame 11 is pivotally attached to the lower ends of the lower toggle-links 12. The lower toggle-links 12 are formed of right and left threaded sections, which are adjustably connected by correspondingly-threaded screw-nuts $12^a$, by means of which the lengths of the links can be altered to regulate the pressure upon the printing-blocks on the cloth, as will presently more fully appear.

13 is the block-carrying platen, which is pivotally attached to the frame 11 at $13^a$ and $13^b$.

14 is the printing-block, secured to the platen 13 in any desired manner. The pivot-hole at $13^b$ is formed slightly oval, as indicated in Fig. 6, so as to insure the lifting of one side of the block 14 a little sooner than the other in order to prevent any sucking action of the blocks. The looseness of the joint may be taken up by springs, if desired, such, for instance, as $13^c$, Fig. 6.

15 is a cross-head working between the vertical guides $15^a$ of the frame extensions 10.

16 are the upper toggle-levers, pivotally attached at their upper ends to the cross-head 15 and pivotally attached at their lower ends to the end of the crank-arms 17, which are keyed to the rock-shafts 18 and 19. The lower adjustable toggle-links 12 are also pivoted to the ends of the crank-arms 17, so that said crank-arms will constitute parts of the toggle-levers which impart the downward motion of the cross-head to the printing-blocks.

Referring now particularly to Figs. 15 and 16, in connection with Figs. 1, 2, 3, 4, and 5, I will proceed to describe my improved means for operating the printing-blocks through the cross-heads and toggle-levers.

20 is an ordinary three-port cylinder provided with the piston 21, which is mounted upon the piston-rod 22. The piston is adapted to be operated by compressed air, steam, or other fluid. The piston-rod 22 is attached at its lower end to the cross-head 15, as indicated at $15^b$, so that the reciprocation of the piston in the cylinder will be imparted to the cross-head and through the toggle-levers to the printing-block.

23 is a D slide-valve operating in the live-air chamber 24 and controlling the supply of live fluid to the cylinder 20 and the exhaust therefrom. The valve 23 is mounted upon the rod 25, which projects from the chamber 24 and by means of which the valve is operated.

26 are curved arms secured to the casing above the main cylinders 20, and 27 is the main supply-pipe, supported by the arms 26 for compressed air or other fluid. 28 is a valve in said pipe 27 for cutting off or regulating the supply of fluid.

29 is the branch pipe leading to the live-air chamber 24.

The exhaust from the cylinder 20 may be into the open air.

The piston-rod 22 projects up through the head of cylinder 20 into a smaller stroke-regulating cylinder 30, in which reciprocates the piston 22ª, which is mounted upon the piston-rod 22. The cylinder 30 has a port 30ª at each end connected by the passage 31. The cylinder 30 and passage 31 are filled with a suitable incompressible fluid, such as oil or water.

32 is a check-valve in the passage 31 for regulating the passage of the fluid from one end of the cylinder 30 to the other end. By opening the check-valve 32 more or less the circulation of the fluid in the cylinder 30 and passage 31 is regulated, or by entirely closing the valve it can be stopped altogether. This circulation of the fluid controls the speed of the piston and through it the entire machine. The check-valves 32 in each of the three regulating-cylinders 30 are mounted upon or otherwise secured to the rock-shaft 33, which extends longitudinally of the machine and is provided adjacent to one end with a crank-arm 34.

35 is a controlling-lever pivoted to a bracket at 36 and connected by a link 37 to the crank-arm 34, by means of which all of the check-valves 32 are simultaneously and correspondingly moved, for controlling the circulation of the fluid in cylinder 30 and passage 31, and thereby regulating the action of the machine. If the valves 32 are closed, the machine will come to a standstill.

In the machine illustrated in the accompanying drawings three sets of the above-described printing mechanism are employed. It is designed that all of the three sets of devices shall automatically and simultaneously operate, and for this purpose I provide a single controlling device at the right-hand end of the machine, which I will now proceed to describe.

The downward and upward motions of the pistons 21 in the cylinders 20 are obtained by admitting and exhausting the compressed air or other fluid above and below the pistons by means of the valves 23, which are mounted on the reciprocating valve-rods 25. For simultaneously actuating these valves 23 I employ an auxiliary controlling-cylinder 40, provided with the piston 41, which is mounted on the piston-rod 42, which extends up through the top cylinder-head. (See Fig. 16.) The piston-rod 42 extends below the cylinder 40 and is provided with the piston 43, which works in the cataract-cylinder 44. The cataract-cylinder 44 and the passage communicating between its ends are filled with oil, water, or other incompressible fluid, the circulation of which, caused by the reciprocation of the piston 43, acts as a drag on the piston 41 in the same manner as the circulation of the fluid through the cylinder 30 and passage 31, above described, and if it were not for this regulator the piston 41 would act too quickly. Attached to the upper end of the piston 42 is a socket-piece 45.

46 is a rock-shaft journaled in the bracket-arms 26 and bracket 47 and extending from end to end of the machine.

48 are short crank-arms projecting from the rock-shaft 46 and engaging in the sockets 49, formed on the upper ends of the valve-rods 25.

50 is a longer crank-arm keyed to right-hand end of the rock-shaft 46 and projecting over and engaging the socket-piece 45, carried by the piston-rod 42, so that the movement of the piston 41 in the auxiliary cylinder 40 will be imparted to the slide-valves 23. For moving the piston 41 in its cylinder (which is an ordinary three-port cylinder) I provide the live-air chamber 51, which is supplied with compressed air or other fluid from the main 27 through the branch pipe 52. The slide-valve 53, mounted on the valve-rod 54, controls the admission and exhaust of the auxiliary cylinder, and said valve-rod 54 extends below the live-air chamber 51 and terminates in a socket 55, which embraces the lever 56, which is pivoted at 57 to the bracket 58, which also supports the lever 35. The lever 56 has an adjustable balancing-weight 59 at its rear end and a handle 60 at its forward end. (See Fig. 3.) By moving the lever on its pivot the slide-valve 53 is shifted and, through the piston 41 and connections, the slide-valves 23, which reverse the main printing-pistons.

Though the lever 56 can be operated by hand, it is preferable to have it automatically controlled by the movement of the printing-blocks. For this purpose I provide a tappet-arm 61 on the platen-carrying frame 11, which extends forward and is formed with a fork 62, which embraces and slides upon a rod 63. The rod 63 passes through a suitable opening near the forward end of the reversing-lever 56 and yieldingly engages said lever above and below by means of the spiral springs 64 and 65, which are confined on the rod 63 and their tension adjusted by means of the screw-nuts 66. (See Fig. 6.)

The adjustable tappet-collars 67 and 68 are secured to the rod 63 at points corresponding to the extremes of the movements of the frame 11, so that said rod 63 will be given a downward or upward movement at the extremes of the movements of the printing-blocks, and through said rod and the reversing mechanism above described the movements of the main pistons will be automatically reversed at the proper times. The lower end of the rod 63 passes through a suitable guide 69 of the lower extension 10 of the carriage.

At each alternate stroke of the printing-blocks, when the blocks are furnished with color, it is necessary to reverse the motion of the pistons at the half-stroke. For this purpose I provide a movable tripping-lever 70, which is pivoted at 71 to a collar 71ª, which is adjustably secured to the end of rod 63. (See Figs. 3, 5, and 6.) The lever 70 is formed with an upper inwardly-turned engaging nose 72 for engaging with the arm 61 and a lower bifurcated heel 73, through which projects and with which engages an operating-rod 74, which is supported in the bearing 75 of the frame 10. The rod 74 is provided with a flange or collar 74ª or equivalent, secured rigidly to it for engaging with the bifurcated end 73 of lever 70, so that any outward movement of the rod will move the lever 70 on its pivot. The spiral spring 76 surrounds the rod 74 and is confined between the collar 74ª and bearing 75 for holding the device in proper position.

77 is a small spiral spring attached to the lower end of the rod 63 and to the tripping-lever 70 for holding the latter in position.

When the carriages containing the color-applying pads (which will be presently fully described) are moved in under the printing-blocks, the right-hand frame impinges against the inner projecting end of the rod 74 and moves the tripping-lever 70 on its pivot until the nose 72 lies in the path of the arm 61, when said lever will be engaged by the arm 61 and the rod 63 (which supports lever 70) will be pulled downwardly, thereby to reverse the pistons at the half-strokes, the bifurcated heel 73 moving on flange 74ª during this action. The parts are brought back into normal position by the springs 76 and 77.

Referring now more particularly to Figs. 3, 6, 7, 8, 9, and 10, I will describe the device for applying color or ink to the printing-blocks.

Securely bolted to the depending auxiliary frame-pieces 10 and projecting out therefrom are the metal track-bars 80, formed with the tracks 81, on which slide the inking-carriages.

82 are the inking frames or carriages, formed with the bearing-flanges 83, which rest on tracks 81. 84 are the inking-pads, supported in the sliding frames or carriages 82. The carriages 82, carrying the pads 84, are adapted to reciprocate under the inking-rollers 85, which are supported in any suitable manner from the bars 80 and receive the color or ink from the pan 86, also carried by said bars 80. Pivotally attached to the lugs 87 of the frames 82 are the rods 88, which are in turn pivotally attached to the lower ends of the arms 89. The rods 88 and arms 89 are braced and spaced by the bars 90, which also constitute the pivots between them. The arms 89 are pivoted at 91ª to brackets 91 and are connected at 92 to the eccentric yokes or rings 93, which embrace the eccentrics 94, that are keyed to the intermittently-rotatable shaft 95, which is also journaled in the brackets 91.

96 is a quadrant-gear keyed to the rock-shaft 18, which is operated by the ascent and descent of the printing-block through the toggle-levers 16 and crank-arms 17. The quadrant 96 gears with a pinion 97, loosely mounted upon the shaft 95 and having ratchet connection with said shaft.

98 is a collar keyed to the shaft 95 and formed with the curved arm 99, in which is pivoted the spring-pawl 100, which engages the eccentric ratchet-teeth 101 of the pinion 97.

In Fig. 3 the printing-block is shown in elevated position. When the block is forced down onto the cloth, the quadrant 96 will be elevated and the pinion 97 freely rotated on the shaft 95. As soon as the impression has been made upon the cloth the block commences its ascent and the quadrant 96 its descent, which causes the pinion 97 to revolve in the opposite direction and be engaged by the pawl 100, carried by the arm 99, which is rigid with the shaft 95. This causes the shaft 95 to make half a revolution, which will cause the carriage 82 to be moved in under the printing-block while the printing-block is rising. The carriage 82, being thrown in under the printing-block, will come into engagement with the rod 74 and throw the nose 72 of the lever 70 into the path of the arm 61, so that in the next descent of the block it will come in contact with the inking-pad and be supplied with ink, (the position of the carriage 82 not being affected by the downward momement of the block,) and its motion will be reversed on the half-stroke through the above mechanism and the rod 61, as already explained. The ascent of the block again, after being inked, causes the shaft 95 to make another half-revolution, which will withdraw the carriage 82 from under the block, as will be clear from the above, and the block will be free to descend upon the cloth for printing.

It is obvious that each of the three printing mechanisms must be provided with some such inking device as above described.

As stated above, it is necessary to provide for moving the carriages transversely in order that the whole of a wide strip of cloth may be printed upon. The carriage is built so as to embrace and guide upon the transverse track-beams 6, and in order that it may be easily moved on the beams it is supported upon the wheels 9ª, which are mounted upon suitable journals in the carriage-frame. (See Fig. 1.) For moving the carriage positively in either direction I employ a series of pinions 105, which are keyed to the shaft 106, extending from end to end of the carriage and suitably journaled therein. (See Fig. 8.) 107 are racks securely bolted to the upper faces of the transverse beams 6, in which the pinions 105 engage. It will be seen that by rotating the pinions 105 the carriage will be moved across the machine.

Loosely mounted upon the shaft 106 are pairs of bevel gear-wheels 108 and 109, which are formed with inner clutch-faces 108ª and 109ª and are confined in place on the shaft by means of the collars 110. Each pair of the bevel gear-wheels 108 and 109 is constantly in gear with a large bevel-gear 111, which is keyed to the rear end of a transverse shaft 112, which extends across the traveling carriage and is suitably journaled therein. The shafts 112 have keyed to their forward ends the bevel gear-wheels 113, which are operated in a manner soon to be explained.

114 is a sliding clutch-sleeve keyed to the shaft 106 and adapted to be shifted into engagement with either of the clutch-faces 108$^a$ or 109$^a$ to rotate the shaft 106 in either direction.

115 are rock-shafts extending across the carriage and supported in suitable journals 116 and having keyed to their rear ends the forked rock-arms 117, which embrace the sliding clutch-sleeves 114 and engage in the central grooves thereof, whereby the rocking of the shafts 115 will shift the clutch-sleeves.

118 are rock-arms keyed to the forward ends of the shafts 115 and extending down into engagement with the cam-grooves 119 of the sleeves 120, which are loosely mounted upon the stationary shafts 121, which are securely held in the brackets 122 in the forward side of the traveling carriage. A half-revolution of the cam-sleeves 120 is required to shift the clutches 114 from one position to the other for reversing the movement of the carriage. The sleeves 120 are each formed with eight ratchet-teeth 123, as indicated in dotted lines in Fig. 11, with which engage the spring-pawls 124, which are carried by the arms 125, which are formed integral with the rings 126, which embrace the ratchet portions of the sleeves 120. The arms 125 are connected by pitmen 127 to the short rock-arms 128, which are keyed to the rock-shaft 19, that receives its oscillatory movement from the arms 17, which are driven by the printing mechanism.

The arms 125, pitman 127, and rock-arms 128 are so proportioned and arranged with relation to the movement of the rock-shaft 19 that the sleeves 120 will only be moved an eighth of a revolution at each long stroke of the printing-blocks when they descend to print, their short strokes for inking not imparting a sufficient movement to the arms 125 to shift the pawls 124 into engagement with new ratchets for moving the sleeves 120 a stroke. The machine makes four impressions from side to side, and as the sleeves 120 are only moved an eighth of a revolution at each impression it will be clear that the sleeves will be rotated one-half a revolution while the machine is making four impressions, and that said half-revolution will shift the clutches 114 and reverse the movement of the carriages. The reversing mechanism is so timed and arranged with respect to the other mechanism that each half-stroke of the sleeves 120 (which shift the clutches 114) will be completed at the time the printing-blocks make their first impression after the cloth has been shifted, the clutch being locked between the fourth and first impressions, as will hereinafter appear.

130 is a bevel-gear meshing with the gear-wheel 113 on the transverse shaft 112. (See Figs. 12 and 13.) 131 is a ratchet clutch-box loosely mounted upon the shaft 121 close up against the collar 130$^a$ and sleeve 130$^b$ of the bevel-gear 130. The clutch is confined by the collar 132, and pivotally attached to the clutch-box is a spring-pawl 133, which is adapted to engage the ratchet-recesses 134 and 134$^a$, formed, respectively, in the periphery of the collar 130$^a$ and sleeve 130$^b$. The sleeves 130$^b$ are loosely mounted upon the collars 130$^a$, and they are capable of rotating together or independently, as will presently appear. There are four ratchet-recesses 134 in the periphery of the collars 130$^a$ and four corresponding recesses 134$^a$ in the sleeves 130$^b$, three of the latter being cut through the sleeves 130$^b$ into the corresponding recesses 134, so that the pawls 133 will engage the collars 130$^a$ when they fall into them, while the fourth recess 134$^a$ in each sleeve does not extend through the sleeve, (see Fig. 13,) but covers the corresponding recess 134, so that when the pawl engages said fourth recess the sleeve alone will be rotated one-quarter of a revolution and the collar 130$^a$ and gear 130 will remain still.

Revolving in one direction the clutch-box 131 will carry the bevel-gear 130 with it and, through the gear 113, revolve the shaft 112, which actuates the carriage-traversing pinions, but if revolved in the opposite direction the pawl 133 will slip over the ratchet-recesses and not move the gear 130.

Formed on the periphery of the clutch-box is a segment 135 of spur-teeth, which is engaged by a quadrant-gear 136, that is keyed to the rock-shaft 19 and intermittently oscillated forward and back by the action of the pistons 21, which operate the printing-blocks. The pawl 133 will not be moved sufficiently far to operate the gear 130 on the short strokes of the printing-blocks, (for inking,) but will be operated only on the long strokes, and as four impressions are made from side to side of the machine the clutch-box 131 will be moved four steps, three of which traverse the carriage, while the fourth merely rotates the sleeves 130$^b$, as explained above. Two sets of such traversing mechanisms are preferably employed.

The carriages upon which the printing mechanisms are mounted move intermittently step by step backward and forward across the machine by means of the above-described traversing mechanism, making four impressions from front to rear, and consequently moving three times to bring the blocks into position for these four impressions. Each time the printing mechanisms reach the front or rear side of the machine two impressions are made near the edge of the cloth and the cloth is drawn forward a step between the two impressions without any movement of the carriages. The mechanism for shifting the clutch-sleeves 114 and collars 130$^a$ and sleeves 130$^b$, above described, are arranged to accomplish this double impression without a movement of the carriages. When the printing-blocks have made their fourth impression at the front or rear side of the machine, it will be found that the cam-sleeves 120 have shifted the rock-shafts 115 just half their stroke, and consequently the clutch-sleeves 114, controlled thereby, will be locked between the clutch-faces 108$^a$ and 109$^a$ in passing from one to the other to reverse the movement of the carriages, and it will also be found that the pawls 133 will be in engagement with the fourth recess 134$^a$, which does not extend through the loose sleeves 130$^b$, and that the necessary rotation of the clutch-boxes 131 after each impression will merely rotate the sleeves 130$^b$ one-quarter of a revolution without moving the gears 130. After each of the following three impressions the pawls will engage the collars 130$^a$ and shift the carriages a step each time, as before. The operation of these parts is constantly repeating.

For stopping and locking in position the movable carriage at the proper places on the track-beams I employ the device shown in Figs. 2, 5, and 14 of the drawings.

137 is a flanged casting secured to the under side of the beam 6 at the left-hand end of the machine, said casting being formed with notches 137$^a$ at the proper points, as indicated by dotted lines in Fig. 14 and full lines in Fig. 3.

138 is a sliding bolt mounted in a bracket 139, which is secured to the side of the carriage extension 10. Pivotally attached to the lower end of the sliding bolt 138 is the bar 140, which in turn is pivoted to the outer end of a trip-lever 141, which is provided with a pin 142. The pin 142 engages and journals in a notch 143, formed in the frame-piece 144, and keyed to the pin 142 on the opposite side of the frame-piece 144 is a plate 145, (indicated by dotted lines,) provided with an eye 146, to which is attached the end of a spiral spring 147. The opposite end of the spring 147 is attached to an eye 148, secured to the frame-piece 144. The bolt 138 is thereby held into engagement with the flanged bar 137 and is forced into the notches 137$^a$ when it comes opposite to them. The nose 141$^a$ or free end of trip-lever 141 projects over into the path of a projecting trip-plate 149, which is carried by the platen-carrying frame 11, so that the bolt 138 is withdrawn from the notches 137$^a$ by the ascent of the printing-blocks on their printing-strokes, and the carriage is allowed to traverse to its next position. When the carriage moves and the end of the lever 141 is released from the frame 11, the spring 147 keeps the bolt 138 pressed up against the flanged plate 137, ready to shoot into the next notch for holding the carriage in position for the next impression.

Referring particularly to Figs. 2, 3, 4, 17, 18, and 21, I will proceed to describe the mechanism for hauling the cloth through the machine.

150 is a flanged rotatable drum mounted on the axle 151, which is journaled in suitable supports at the right-hand end of the machine.

152 is a roller journaled in the curved arms or supports 153, which are secured to the edges of the standards at the opposite end of the machine.

154 is a curved belly or frictional guide-plate secured between the supports 153, over which the cloth passes as it is unwound from the roll 155, which is journaled on the axle 156, supported on the lugs 157. The belly 154 is secured to the arms 153 below the edges, so as to provide flanges for keeping the cloth straight.

158 is a transverse axle adjustably supported at its opposite ends upon the rods 159, which extend below from the shoulders 5 of the main frame.

158$^a$ is a roller mounted upon said axle, and 160 are grooved pulleys at the ends of the roller 159. The roller 152 is also provided with grooved pulleys at its ends. Passing around the grooved pulleys at the ends of the drum 150 and rollers 152 and 158$^a$ are chains 160$^a$, (indicated by dotted lines,) which may be provided with points for engaging with the cloth to draw it through the machine. The drum 150 is preferably covered with carding-wire, and the carding-wire may also be put on the rollers 152 and 158$^a$.

Keyed to the outer end of the axle 151, inside of the bearing 151$^a$, is a ratchet-disk 161, formed with ratchet-recesses 161$^a$. Pivoted upon the pin 162, which is supported in a bracket secured to the arm 151$^b$, is a pawl 163, which is adapted to be thrown into engagement with the notches 161$^a$ by gravity, the lower flattened end 163$^a$ being sufficiently heavy to keep the nose of the pawl normally in contact with the disk 161. This pawl is designed to prevent the drum from winding the cloth while it is being printed on.

165 is a grooved quadrant, having a bearing 165$^a$ loosely mounted on the shaft 151 and confined in place adjacent to the disk 161 by means of the collar 166. Pivoted to the quadrant 165 is a gravity-pawl 167, which rests on the periphery of the disk 161 and is adapted to engage in the notches 161$^a$ for engaging the ratchet-disk and rotating the drum.

165$^b$ is a rounded cam end on the quadrant 165, which is adapted to engage the flattened end 163$^a$ of the pawl 163 and move it out of engagement with the notches of the ratchet-disk 161, as shown in dotted lines in Fig. 18. The pawl 163 is for the purpose of locking the drum against forward movement while the cloth is being printed upon, but as soon as the cam 165$^b$ disengages the pawl the drum can be moved forward by the quadrant, but only a certain distance, for as the next notch in the wheel comes under the pawl it enters the notch and instantly locks the drum against further movement.

168 is a spiral spring attached at 168$^a$ to the quadrant and at 168$^b$ to the standard. The spring 168 is for the purpose of retracting the quadrant into the position shown in dotted lines in Fig. 18 after it has completed its forward stroke.

170 is a compressed-air or other fluid cylinder secured to the upright 2 by the bracket 170$^a$ (see Figs. 20 and 21) and provided with a vertically-reciprocating piston, to which is secured the piston-rod 171, which projects through the lower cylinder-head.

172 is a chain attached at one end to the quadrant 165 and at the other end to the piston-rod 171. The chain works in the groove of the quadrant 165, and when the piston is forced up in the cylinder by admitting the compressed air below it the quadrant is carried forward, and through it the drum 150 is rotated. Upon the air being released from the under side of the piston in the cylinder 170 the quadrant is drawn back by the spring 168.

The compressed-air supply and exhaust for cylinder 170 is through the piston-valve 173, which is operated by opening and closing the rotary three-way cock 174, which communicates therewith through the air-pipe 175. When the cock 174 is opened, the piston-valve 173 is automatically opened by the air to admit the air under the piston in the cylinder 170 for raising it, and when cock 174 is closed the piston-valve shifts to allow the cylinder 170 to exhaust. The cock 174 has keyed to its plug the operating-arm 176, provided with a latch-nose 176$^a$. Pivoted upon the journal 177 is a bell-crank latch-lever 178, which is automatically thrown into engagement with the nose 176$^a$ for temporarily holding the cock in closed position.

179 is an arm fixed to the piston-rod 171 and extending back toward the cock 174 and formed with a notched or bifurcated rear end 180, which bears and slides on the vertical rod 181, which is secured to the standard 2. Journaled in the bearing 182 on the rear of the front standard 2 is a rock-shaft 183, which has keyed to one end the crank-arm 184 and to the other end the crank-arm 185. The crank-arm 184 is connected to the arm 176 of the cock by means of the rod 186. The crank-arm 185 is provided with a series of perforations, in which is adapted to engage the end of a spiral spring 187, which is connected at its opposite end to the eye 188. The spring 187 tends to elevate the arm 184 to the position shown in dotted lines in Fig. 20 for holding the cock 174 open or in the position indicated by line C D (see Fig. 21) and keeping the piston in cylinder 170 elevated. The cock is, however, automatically closed for a short interval by the vertically-moving printing-carriage when it is desired to shift the cloth. The means for accomplishing this will now be described with reference to Figs. 19, 20, and 21.

The platen-carrying frame has forwardly and rearwardly projecting arms 190, to which are pivoted the trips 191, which are capable of moving upwardly on their pivots but not downwardly.

192 is a trip-finger keyed to the end of the rock-shaft 183 and adapted to be engaged by the forward trip 191 when the traveling carriage is at the front of the machine and the platen-carrying frame moves to its upper position. The result of this will be the closing of the cock 174 by throwing the operating-arm 176 into the position shown in full lines, Fig. 20, and in dotted lines, Fig. 21, with the latch 178 into engagement with the nose 176$^a$ for holding the cock closed. When the cock is closed, it is in the position indicated by the line A B, and the pressure from the main supply is cut off from the bottom of the piston-valve 173, and the air remaining in the pipe is exhausted through the opening 203. This enables the pressure from the main supply through the pipe 200 and the passage 201 to force the valve down, causing the part 14$^a$ of the piston-valve 173 to close the opening in the pipe 200 and allow the air to exhaust from the cylinder 170 through the opening 17$^c$ to the atmosphere. This allows the piston to drop, and as it drops the spring 168 retracts the quadrant 165 to the position shown in dotted lines, Fig. 18. The arm 179 is formed with an offset 179$^a$, carrying an adjustable screw-trip 179$^b$, which is adjusted to engage one arm of the bell-crank latch 178 and release the cock. Therefore when the arm 179 is drawn down into lowest position the trip 179$^b$ disengages the latch 178 from the nose 176$^a$ and allows the spring 187 to open the cock again. This will again supply compressed air to the under side of the piston in cylinder 170 and cause it to rise, and as the pawl on the quadrant has engaged the ratchet-disk 161 the drum 150 will be rotated and the cloth shifted to supply a new surface to be printed upon. It will be understood that this operation is so timed and arranged to take place while the printing-block is being inked for the first of a new series of impressions, and the parts do not return to normal position until after the printing-block has completed its first impression of the new series and is ready to be moved into position for the second impression of that series.

195 is a rock-shaft journaled in the bearing 196, secured to the front of the rear standard 2. Keyed to one end of the rock-shaft 195 is a trip-finger 197, which is adapted to be engaged by the rear trip 191, and keyed to the opposite end of the rock-shaft 195 is a crank-arm 198, which is connected by means of the rod 199 to the lower end of the crank-arm 185, so that the movement of the rock-shaft 195 will be communicated to the rock-shaft 183. Thus when the traveling carriage is at the rear side of the machine and the platen-carrying frame 11 is moved up the same operation of shifting the cloth will take place.

In order that the operation of my improved machine may be fully understood, I will now proceed to describe in a general way the relative movements of the more important parts, the detailed operation of the several parts being clear from the above description.

The machine is automatic throughout, and after it has once been started by turning on the supply of compressed air or other fluid it will continuously print upon the whole surface of the cloth from side to side and end to end, each printing-block being supplied with ink or color after each impression. The three printing-blocks are complements of each other, so that the impressions of all are necessary within the same section of surface to produce a complete design. To accomplish this, the cloth is moved, after each series of four impressions is made from side to side of the cloth, the distance from the head of one printing-block to the head of the next printing-block. The cloth being run through the machine from the supply-roll and attached to the feeding-roll, the compressed air or other fluid is turned on and the machine starts. All three printing-blocks will first print upon the left-hand side or front edge of the cloth. (See Fig. 3.) At the lower end of the stroke of the printing-blocks in making the first impression the tappet-arm 61 reverses the power-pistons and causes the printing-blocks to be drawn up, and the trip-plate 149 releases the bolt 138 and allows the carriage to traverse to second position, when it is again automatically locked. This upward movement of the printing-blocks throws the inking devices in under the blocks through the mechanism already described. When the printing-blocks reach the upper end of their stroke, the tappet-arm 61 again reverses the power-pistons and starts them on another downward stroke. This second downward stroke is for the purpose of applying color to the blocks, and as the tripping-lever 70 has been thrown into the path of the tappet-arm 61 by means of the color-applying carriage the printing-blocks will not descend a complete stroke. When the blocks come in contact with the inking-pads, the tappet 61 comes into engagement with the lever 70 and the power-pistons will again be reversed and the printing-blocks drawn up, which also causes the inking devices to be withdrawn from under the blocks. This action is repeated in quick succession, the color being applied after each impression upon the cloth. During the time occupied by inking the blocks the carriages supporting the printing mechanisms are moving from the position of their first impression into position to make their second impression. This movement of the carriages is imparted through the crank-arm 17 and other mechanism already specifically described, the movement imparted to said arm by the return portion of the long stroke of the printing-blocks (after making the first impression) being sufficient to place the carriage in proper position for the second impression.

The carriage being in proper position, the second impression of the printing-blocks is made alongside of the first impression, and after this the blocks are again provided with color and the carriage is again moved into the third position, when the third impression of the blocks is made alongside of the second impression. The fourth impression is made in the same way along the rear side of the web of the cloth. After the blocks have made their fourth impression at the rear side of the web of cloth they ascend and descend again to have the color applied for the first of a new series of impressions, and as they ascend after making the fourth impression one of the trips 191 trips the mechanism which controls the cloth-feeding roll, and the cloth will be drawn forward the necessary distance by the mechanism and in the manner already explained. The blocks then descend for color, and after receiving color the blocks will then be ready to apply a second impression on the rear side of the web of cloth, (the first of a new series across the cloth,) the carriage remaining in its position at the rear side of the machine for this purpose by reason of the temporary inactivity of the traversing mechanism at this point, as has already been explained. The ascent of the blocks from the inking-pads in readiness for the fourth impression and from the cloth after the first of the new series of impressions does not actuate the cloth-feeding mechanism, for in the first instance the carriage does not descend far enough to strike the trip 197, and in the second instance after the carriage ascends from the cloth the shifting mechanism is put into operation, and as the printing-block ascends its line of travel will be in a diagonal direction away from the said trip.

During the movements of the printing-blocks the carriage-reversing mechanism has been constantly in operation, but by reason of the peculiar shape of the controlling-cam and the timed connections with the rock-shaft 19, which have already been fully described, the carriage is made to move one step after each of the first three impressions and then drop a stroke and move in the reverse direction after the second impression at the rear side of the machine. This action is accomplished by so timing the mechanism which controls the reversal of the carriage with the clutch 114 on shaft 106 that said clutch is locked between the clutch-faces $108^a$ and $109^a$ and does not allow the carriage to move while the pawl and ratchet operating mechanisms are temporarily inactive. After the second stroke at the rear side of the machine, however, the clutch 114 has been completely shifted into engagement with the clutch-face of the bevel gear-wheel 109 and the carriage is in readiness to move one step toward the front side of the machine. The movements of the parts are the same in going toward the front, and when the front edge of the cloth is reached two impressions are made in the same way, as already explained. After the first of the two impressions of the blocks has been made at the front side of the machine the cloth is again moved longitudinally, as already explained.

Having thus described my invention, the following is what I claim as new therein and desire to secure by Letters Patent:

1. The combination of the main frame, the cloth-supporting table mounted in the main frame, the transverse track-beams forming part of the main frame, the traveling carriage provided with supporting-wheels which run on said track-beams, the rack-bars secured to said track-beams, the traversing pinions journaled in the traveling carriage and meshing in the rack-bars, means for rotating the pinions in either direction, means for automatically controlling the direction of rotation, and printing mechanism mounted on the carriage, substantially as set forth.

2. The combination of the frame-standards formed with oblong base and vertical column portions secured together at their base portions and arranged in front and rear series, the cloth-supporting table mounted between the two series of standards, the track-beams supported on the tops of the columns of the standards and extending from the front to the rear standards, the traveling carriage mounted on the track-beams, the printing mechanism mounted on the carriage, and means for traversing the carriage, substantially as set forth.

3. The combination of the frame-standards formed with oblong base and vertical column portions arranged in front and rear series, the shoulders 5 projecting inwardly from the standards, the longitudinally-extending bars 4 resting on the flanges 5, the trussed cloth-supporting table mounted upon the bars 4 between the standards, the track-beams supported on the tops of the columns of the standards and extending from the front to the rear standards, the traveling carriage mounted on the track-beams, the printing mechanism mounted on the carriage, and means for traversing the carriage substantially as set forth.

4. The combination of the main frame, the cloth-supporting table mounted in the main frame, the track-beams forming part of the main frame, the traveling carriage carrying the printing mechanism and supported on the track-beams, the rack-bars secured to the track-beams, the traversing pinions meshing with said rack-bars and mounted upon a rotatable shaft journaled in the carriage, oppositely-arranged gear-wheels, loosely mounted upon the rotatable shaft, a driving-pinion gearing with both of said loosely-mounted pinions, a clutch keyed to the rotatable shaft and adapted to be shifted into engagement with either pinion, and means for imparting motion to the driving-pinion, substantially as set forth.

5. The combination of the main frame, the cloth-supporting table mounted in the main frame, the track-beams forming part of the main frame, the traveling carriage carrying the printing mechanism and supported on the track-beams, the rack-bars secured to the track-beams, the traversing pinions meshing with the rack-bars and mounted upon a rotatable shaft which is journaled in the carriage, oppositely-arranged gear-wheels loosely mounted upon the rotatable shaft and formed with inner clutch-faces, a driving-pinion gearing with both of said loosely-mounted pinions, a clutch-sleeve keyed to the rotatable shaft and adapted to be shifted into engagement with either of the loosely-mounted pinions, a rock-shaft journaled in the carriage, a rock-arm keyed to the rock-shaft and engaging the clutch-sleeve, a second rock-arm also keyed to said rock-shaft, a cam engaging said second rock-arm, and means for intermittently operating said cam for shifting the clutch-sleeve and changing the direction of the carriage, substantially as set forth.

6. The combination of the main frame, the cloth-supporting table mounted in the main frame, the track-beams forming part of the main frame, the traveling carriage carrying the printing mechanism and supported on the track-beams, the rack-bars secured to the track-beams, the traversing pinions meshing with the rack-bars and mounted upon a rotatable shaft which is journaled in the carriage, oppositely-arranged gear-wheels mounted loosely upon the rotatable shaft and formed with inner clutch-faces, a driving-pinion gearing with both of said loosely-mounted pinions, a clutch-sleeve keyed to the rotatable shaft and adapted to be shifted into engagement with either of the loose pinions, a rotatable cam, a rock-shaft journaled in the carriage and provided with an arm at one end which engages the clutch-sleeve and an arm at the other end which engages the cam, ratchet-teeth on the cam, an oscillating arm carrying a pawl which engages with the ratchet-teeth, an intermittently-operated rock-shaft, an arm keyed to said rock-shaft, and a pitman connecting said arm with the pawl-supporting oscillatory arm, substantially as and for the purpose set forth.

7. The combination of the main frame, the cloth-supporting table mounted in the main frame, the track-beams forming part of the main frame, the traveling carriage carrying the printing mechanism and supported on the track-beams, the rack-bars secured to the track-beams, the traversing pinions meshing with the rack-bars and mounted upon a rotatable shaft which is journaled in the carriage, oppositely-arranged gear-wheels mounted loosely upon the rotatable shaft, a clutch for throwing either gear-wheel into gear with the shaft, a rotatable transverse shaft journaled in the carriage, a gear-wheel keyed to the end of said shaft and gearing with both of the loose gear-wheels, another gear-wheel keyed to the opposite end of said shaft, a ratchet-clutch geared to said last-mentioned gear-wheel, an intermittently-oscillating rock-shaft, and a quadrant keyed to said rock-shaft and gearing with the ratchet-clutch, substantially as and for the purpose set forth.

8. In a linoleum or other cloth printing machine, the combination of a cloth-supporting bed or table, a reciprocating platen-carrying frame supported above the bed or table, a block-carrying platen pivotally attached to the reciprocating frame by a tight joint at one side and a loose joint at the other side to avoid any sucking action of the block by causing one side to lift before the other, a suitable spring or springs interposed in the loose joint, and means for operating the platen-supporting frame, substantially as and for the purpose set forth.

9. In a linoleum or other cloth printing machine, the combination of a cloth-supporting bed or table, a reciprocating printing-block supported in proper relation to said bed or table, a compressed-air or other fluid cylinder, a piston working in said cylinder and connected with the printing-block for operating it, and a reciprocating inking-pad controlled by the movement of the piston and adapted to apply color to the block, substantially as described.

10. In a linoleum or other cloth printing machine, the combination of the main frame, the cloth-supporting bed or table mounted in the main frame, the transverse track-beams forming part of the main frame, the traveling carriage supported on the track-beams, the downwardly-projecting extensions of the carriage forming vertical and horizontal guides or tracks, the reciprocating block-carrying frame mounted in the vertical guides, the reciprocating inking-pad working in the horizontal guides, a compressed-air or other cylinder supported above the block-carrying frame, the piston working in said cylinder, suitable traversing mechanism for moving the carriage back and forth on the track-beams, and means operated by the piston for actuating the block-carrying frame, the inking-pad and carriage-traversing mechanism in proper relation to each other, substantially as and for the purpose set forth.

11. In a linoleum or other cloth printing machine, the combination of a cloth-supporting bed or table, a reciprocating block-carrying frame, a compressed-air or other fluid cylinder, a piston working in said cylinder and connected with the block-carrying frame for operating it, a valve for regulating the supply and exhaust of the cylinder, a lever controlling the valve, a rod depending from the lever and provided with tappet-collars, and a trip-lever pivoted to the depending rod, a sliding rod adapted to move the trip-lever into operative position, a sliding ink-pad adapted to actuate said sliding rod, means for operating the ink-pad, and an arm projecting from the block-carrying frame and adapted to engage the tappet-collars and trip-lever, whereby the mechanism can be reversed on the whole or half stroke, substantially as set forth.

12. In a linoleum or other cloth printing machine, the combination of a suitable framework, the cloth-supporting bed or table, the traveling carriage supported on the framework above the bed or table, the vertically-reciprocating block-carrying frame mounted in said carriage, a notched plate secured to the framework along the path of the carriage, a spring-pressed sliding bolt supported on the carriage, a trip attached to said sliding bolt and adapted to be operated by the vertically-reciprocating block-carrying frame, means for traversing the carriage, and means for operating the block-carrying frame, substantially as and for the purpose set forth.

13. In a linoleum or other cloth printing machine, the combination of the cloth-supporting bed or table, the printing mechanism, a rotatable drum over which the cloth passes from the table, a ratchet-disk keyed to the axle of the drum, a flanged quadrant loosely mounted on the drum-axle and carrying a pawl which is adapted to engage the ratchet-disk, a spring for retracting the quadrant, a compressed-air or other fluid cylinder, a piston working in said cylinder and provided with a piston-rod, a chain secured to the quadrant at one end and to the piston-rod at the other end and working in the groove of the quadrant, and means for controlling the operation of the piston, substantially as set forth.

14. The combination of the main frame, the cloth-supporting table mounted in the main frame, the transversely-traveling carriage, the printing mechanism mounted on the carriage, means for traversing the carriage, and means controlled by the printing mechanism for automatically imparting an intermittent movement to the cloth over the table, substantially as and for the purpose set forth.

15. The combination of the main frame, the cloth-supporting table mounted in the main frame, the traveling carriage, the vertically-movable block-carrying frame mounted in the carriage, means for traversing the carriage, means for drawing the cloth over the table, and means actuated by the vertically-movable block-carrying frame at the extremes of travel of the carriage for setting the cloth-drawing mechanism into operation, substantially as set forth.

16. The combination of the main frame, the cloth-supporting table mounted in the main frame, the vertically-movable block-carrying frame, the cloth-moving drum, the compressed-air or other fluid cylinder, the piston working in said cylinder, a suitable connecting means between the piston and drum, whereby the piston is adapted to intermittently revolve the drum for drawing the cloth forward over the table, a suitable valve controlling the fluid supply and exhaust of the cylinder, and suitable means controlled by the block-carrying frame for actuating said valve for throwing the drum into operation, substantially as and for the purpose set forth.

17. The combination of the main frame, the cloth-supporting bed or table mounted in the main frame, the vertically-movable block-carrying frame, the cloth-moving drum, the compressed-air or other fluid cylinder, the piston working in said cylinder, a suitable connecting means between the piston and drum whereby the piston is adapted to intermittently revolve the drum for drawing the cloth forward over the table, a suitable valve controlling the fluid supply and exhaust of the cylinder, a rock-shaft provided with a rock-arm, means connecting the rock-arm with the valve, a trip-finger keyed to the rock-shaft, and a trip-finger supported on the block-carrying frame, substantially as and for the purpose set forth.

18. The combination of the main frame, the cloth-supporting bed or table mounted in the main frame, the vertically-movable block-carrying frame, the cloth-moving drum, the compressed-air or other fluid cylinder, the piston working in said cylinder and provided with a piston-rod, means connected with said piston-rod and the drum for intermittently revolving the drum, a valve controlling the fluid supply and exhaust of the cylinder, means for automatically opening the valve, mechanism actuated by the block-carrying valve for closing the valve, a latching device for holding the valve in locked position, and an arm projecting from the piston-rod and adapted to release the valve from the latching device and allow it to open, substantially as and for the purpose set forth.

In testimony whereof I have signed my name to this specification in the presence of two subscribing witnesses.

THOS. DALE.

Witnesses:
 JOHN LIDDLE,
 ARTHUR HARTLEY YUILE.